United States Patent
Holenstein et al.

(10) Patent No.: US 7,555,145 B2
(45) Date of Patent: Jun. 30, 2009

(54) MULTI-LEVEL OPTICAL MARK READING THAT USES AN UNAMBIGUOUS SYMBOLOGY OF MARKS TO FILL INTO RESPONSE BUBBLES

(75) Inventors: Bruce D. Holenstein, Media, PA (US); Owen C. Davison, Honeybrook, PA (US); Victor F. Berutti, Glenmore, PA (US); Paul J. Holenstein, Downingtown, PA (US)

(73) Assignee: Gravic, Inc., Malvern, PA (US)

( * ) Notice: Subject to any disclaimer, the term of this patent is extended or adjusted under 35 U.S.C. 154(b) by 793 days.

(21) Appl. No.: 10/859,483

(22) Filed: Jun. 2, 2004

(65) Prior Publication Data

US 2004/0245339 A1 Dec. 9, 2004

Related U.S. Application Data

(60) Provisional application No. 60/475,342, filed on Jun. 3, 2003.

(51) Int. Cl.
*G06K 9/00* (2006.01)
*G06K 9/48* (2006.01)
*G06K 9/46* (2006.01)
*G09B 7/00* (2006.01)
*G06K 7/10* (2006.01)

(52) U.S. Cl. .................. 382/113; 382/195; 382/200; 382/203; 434/353; 434/356; 434/358; 434/362; 235/454

(58) Field of Classification Search .......... 235/454; 382/113, 195, 200, 202, 203; 434/355, 356, 434/358, 359, 362
See application file for complete search history.

(56) References Cited

U.S. PATENT DOCUMENTS

| | | | | |
|---|---|---|---|---|
| 3,858,180 | A | * 12/1974 | Spanjersberg | 382/192 |
| 4,937,439 | A | 6/1990 | Wanninger et al. | |
| 4,989,258 | A | * 1/1991 | Takahashi et al. | 382/226 |
| 5,102,341 | A | * 4/1992 | Koslin | 434/353 |
| 5,134,669 | A | * 7/1992 | Keogh et al. | 382/318 |

(Continued)

FOREIGN PATENT DOCUMENTS

WO   WO03010704 A1 * 2/2003

*Primary Examiner*—Matthew C Bella
*Assistant Examiner*—Michael A Newman
(74) *Attorney, Agent, or Firm*—Panitch Schwarze Belisario & Nadel LLP

(57) ABSTRACT

One or more response bubbles are used on a scannable form to be read by a scanning system. An unambiguous symbology of marks is defined to fill into each response bubble, thereby allowing at least one of a plurality of different non-empty intended responses having different output values to be entered into each response bubble. One or more response bubbles are provided on the scannable form to be filled in according to the defined symbology of unambiguous marks. A filled in form is scanned with the scanning system and an image of the scanned form is processed by identifying pixels associated with each response bubble, interpreting the pixels associated with each response bubble to define a raw score according to the defined unambiguous symbology of marks used to mark each response bubble, translating the raw score for each response bubble into one of the plurality of different intended non-empty responses, and outputting the value of the non-empty response for each response bubble. Different output values have different meanings.

43 Claims, 7 Drawing Sheets

U.S. PATENT DOCUMENTS

| | | |
|---|---|---|
| 5,184,003 A | 2/1993 | McMillin et al. |
| 5,235,655 A * | 8/1993 | Hikawa ....................... 382/317 |
| 5,452,379 A * | 9/1995 | Poor ........................... 382/317 |
| 5,711,673 A * | 1/1998 | Grundy, Jr. .................. 434/353 |
| 6,854,644 B1 * | 2/2005 | Bolton et al. ................ 233/375 |

* cited by examiner

Please enter your Social Security number

Figure 1c
(Prior Art)

KEY:
| strongly disagree, | disagree, | neutral, | agree, | strongly agree, | no opinion |
|---|---|---|---|---|---|
|  |  |  |  |  |  |
Q1. I like carrots. 
Q2. Soda makes me sick. 
Q3. Candy is a fun thing to eat. 
Q4. I love working at my company. 
Q5. My office is too warm. 
Example alternate key (uses a different translation table):
| strongly disagree, | disagree, | neutral, | agree, | strongly agree, | no opinion |
|---|---|---|---|---|---|
|  |  |  |  |  |  |
Figure 2

Elongated Bubble Column
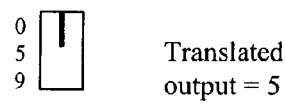 Translated output = 5
Figure 3
Mark Density
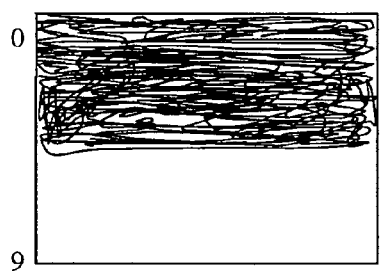
Figure 4a (50% filled)
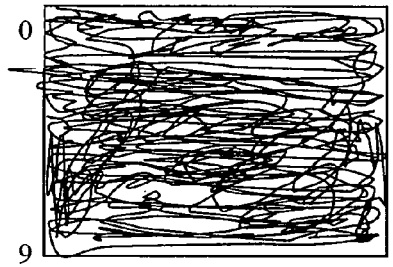
Figure 4b (also 50% filled, i.e. not fully blackened)
Position of line
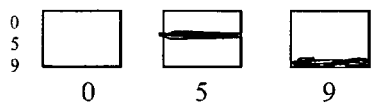
Figure 5a  Figure 5b  Figure 5c
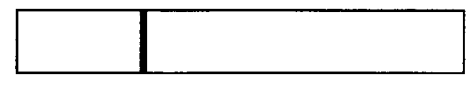
Figure 5d
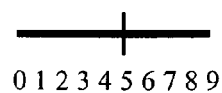
0 1 2 3 4 5 6 7 8 9
Figure 5e

Mark Angle
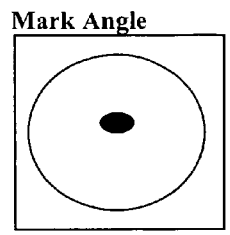
Figure 6a
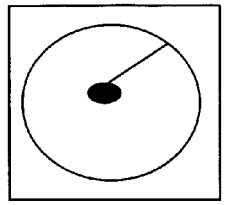
Figure 6b
Interpreted "angle" is translated into a number.
= 45
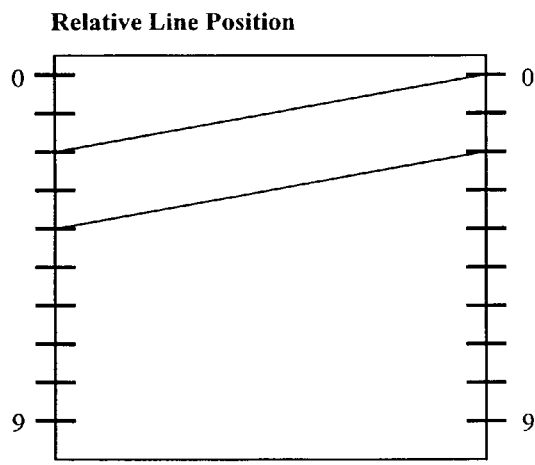
Figure 7   Difference
(both lines represent 2)
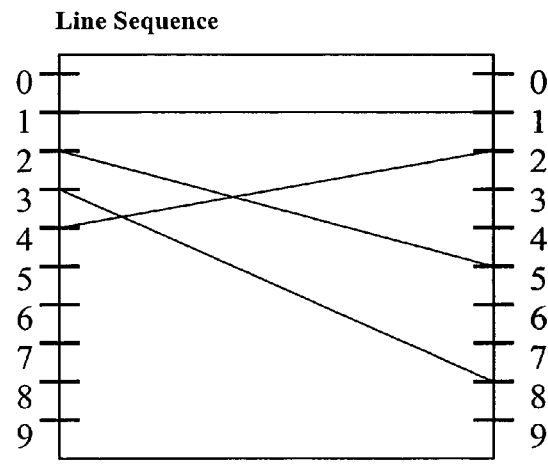
= 1582
Figure 8       Sequential
(each digit is represented by
line starting on the left)

Mark Areas
| 0 | 1 | 2 | 3 | 4 |
|---|---|---|---|---|
| 5 | 6 | 7 | 8 | 9 |
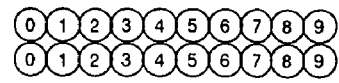
Figure 11a                                             Figure 11b
Overlapping Marks (Shapes)
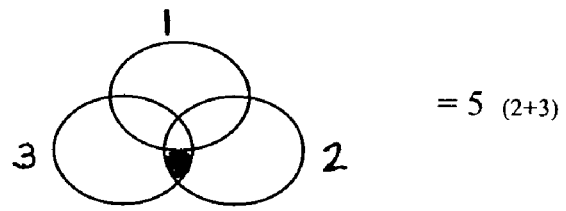
Figure 12
Disregard Scale
0   1   2   3   4   Disregard
O   O   O   O   O         O
Figure 13

MULTI-LEVEL OPTICAL MARK READING THAT USES AN UNAMBIGUOUS SYMBOLOGY OF MARKS TO FILL INTO RESPONSE BUBBLES

CROSS-REFERENCE TO RELATED APPLICATIONS

This application claims the benefit of U.S. Provisional Application No. 60/475,342 filed Jun. 3, 2003.

BACKGROUND OF THE INVENTION

1. Traditional OMR

Optical Mark Reading (OMR) is a technology that has been around for decades. A common application of OMR is in standardized testing. In these tests, respondents indicated their answer to a question by filling in, or marking, "bubbles" (response bubbles) or "marks" on a pre-printed form with a dark (number two) pencil. The interpreted binary raw scores of "filled" or "unfilled" must be fully translated in combination with additional bubbles into meaningful output results. For example, in the case of a survey or test, the individual bubbles may each correspond to the answers "A", "B", or "C", or the numbers "0" to "9". See, for example, FIG. 1a and FIG. 1b wherein the fourth and sixth bubbles are filled with the black dot symbol, respectively. The raw score is translated into the output values "D" and "5". FIG. 1c is an example of a nine-digit number bubble field.

OMR devices make the determination of whether or not a bubble (which can also take on other shapes, or which may even be an outline) is filled, or unfilled by a user that makes a black dot symbol. Systems capable of processing these forms traditionally rely on expensive, dedicated hardware and require the purchase of expensive, pre-printed forms.

Traditional hardware-based OMR systems have been available for years from companies such as National Computer Systems (now called Pearson NCS,) of Eden Prarie, Minn., and Scantron Corporation of Irvine, Calif. Such systems are disclosed, for example, in U.S. Pat. Nos. 5,184,003 (McMillin et al.); and 4,937,439 (Wanninger et al.). Traditional OMR systems typically rely on specially printed forms utilizing "drop-out" colors (i.e., colors that are not read by the reader), and dedicated scanning machines, called OMR readers. Forms typically have to be completed using a number two pencil or in some cases, a colored pen (e.g., blue or black).

OMR forms have a "timing track", made up of dark timing lines on the edge (or sometimes the top) of the page. These timing lines are detected by the reader as it moves the piece of paper (the form) past a read head. The read head contains a series of sensors (typically 48 across the page) that measure the amount of light returned from the page. Forms designed for OMR readers are often printed using special drop-out colors because they are readable by the human eye, but drop-out or disappear when scanned so as to not affect the output data. A number two pencil is used to mark the form because the pencil lead does not reflect the light back to the sensor. The special colors (like a light blue or red) drop-out colors reflect enough light back to the read sensors to be considered "unfilled". For example, the possible answers to a question might be "A", "B", "C", "D", and "E". These possible answers could be represented on the form by printing a series of bubbles with the corresponding letters within them. Both the bubbles and the letters could be printed using a drop-out color so that the OMR reader does not report that the bubbles are already filled.

When a timing line is found, the reader polls each of its sensors and creates a "read level" for each. Each sensor provides a read level value between 0 and the maximum, N. There is a value, T, between 0 and N which is deemed to be the recognition threshold. Usually, any sensors returning a value at or above (darker) the recognition threshold will be considered "filled" bubbles, and any below the threshold will be "unfilled". Even though the reader may be calculating read levels, the output of the OMR reader for each bubble will usually be correct because the difference in read levels is enough to eliminate all ambiguity that a user made the black dot symbol inside the bubble or not.

2. Software-Based OMR

Newer software-based OMR systems work with image scanners and easily created plain paper forms. Systems such as Remark Office OMR® by Principia Products, a division of Gravic, Inc., Malvern, Pa., use sophisticated software algorithms to eliminate the need for the timing lines on a form, thereby allowing the forms to be created with common office tools like a word processor and laser printer. However, existing software-based systems still produce one of two states for each of the bubbles on the page: "filled" or "unfilled". As in traditional OMR, the values are later translated into more complex data by the software algorithm, for example "A" to "Z" or "0" to "9" or "Jan" to "Dec", but the output of the reader used to interpret the bubbles is binary.

Software-based OMR systems use a self-registering algorithm wherein the bubbles that are to be recorded as either filled (or not) are in and of themselves used in a search algorithm to locate the bubbles on the page that are to be identified, thereby eliminating the need for the special paper and typical timing, framing, or other form registration marks that are found on the traditional OMR systems. Self-registering OMR means that the bubbles must be sufficiently well separated from each other and from the text and graphics on the form, thereby taking up precious additional space on the form.

To collect demographic data using traditional or software-based OMR system (such as a name or social security number) a very large field of bubbles has to be used. For example, to capture a social security number code using OMR, the form would typically include an array of nine rows of bubble fields (one each for "0" to "9"). The array size determines the maximum number of characters in the output number. Hence, for a nine digit number, 9×10 or 90 markable bubble areas are needed, as depicted in FIG. 1c.

The main value of traditional and software-based OMR systems is that they both have a very desirable accuracy approaching 99.9% or higher. This means that there is less than one error per one thousand bubbles on a page. Additionally, they are very fast, typically one page or more scanned per second. The speed and accuracy of OMR is a direct result of humans marking bubbles with an unambiguous symbol, the black dot, and the image processing algorithms then only having to discriminate between two choices.

3. Intelligent Character Recognition

Intelligent Character Recognition (ICR) systems of the type sold by Cardiff Software (now Verity, Inc.) of Sunnyvale, Calif. and others, in contrast, allow a person to fill in a bubble with a hand drawn letter or number symbols thus taking up little space on a form for each piece of data collected. (Some ICR systems even allow multiple characters to be drawn in each bubble.) The marks that a person makes in a bubble are directly interpreted as what was drawn, instead of being translated as in OMR. For example, a person draws a "9" and the output of the ICR system is an ASCII "9". The price of directly interpreting the bubbles and skipping a translation step which has limited choices is that the typical accuracy of ICR systems is from 95 to 98%, or several orders of magnitude less than OMR. For example, ICR systems have trouble interpreting and translating the symbols for "I" and "1" into the correct output. Thus, there might be dozens of errors that must be corrected on a typical form page. In typical form reading applications for surveys and tests, spelling checkers or context lookups (e.g., zip codes) are often not possible. Thus, the errors must be corrected by hand, thereby reducing the value of ICR software for forms reading. Additionally, ICR systems may take tens of seconds to minutes to directly interpret a single page of text and are considered slow compared to OMR systems.

There is an unmet need to have an automated system and method of collecting data from forms that yields the high accuracy and speeds that full translation of unambiguous symbols allows with OMR, uses easily created forms like software-based OMR readers do, and requires little real estate on the form like ICR allows thereby saving on paper and printing costs.

BRIEF SUMMARY OF THE INVENTION

The present invention, called "Multi-Level OMR," represents an automated system and method in which an unambiguous set of symbol marks are filled into bubbles, the marks are interpreted according to special algorithms, and are then translated into a limited set of output states which number more than two. (In contrast, conventional OMR provides only two output states.) However, direct interpretation of ambiguous symbols as with ICR into hundreds of states (i.e., all of the letters of the alphabet and numbers) is avoided. Specifically, a bubble may thus have more than two possible states: unfilled and n number of additional filled states depending upon the bubble type (shape, size, marking symbology, etc.), the methodology used to complete the bubble (pen, pencil, crayon, punch, etc.), the sequence applied to the bubble (part of a number, multiple choice, etc.), and the translation scale applied to the raw recognition score ("A" to "F", or "0" to "9", etc.). Thus, Multi-Level OMR allows the same information to be collected using a significantly smaller amount of space on the form than regular OMR. For example, using the example of entering a person's social security number in FIG. 1c, one embodiment of Multi-Level OMR uses a bubble field that contains only nine bubbles (one per possible digit in the code) instead of the 90 used in traditional OMR. Reducing the amount of form space required to collect data reduces the amount of paper used to collect data. Smaller form sizes reduce the cost of producing the forms and may increase the response rate of study participants. After practice, users may very well find that filling in a Multi-Level OMR bubble is easier, as it is more intuitive to have one bubble per question or letter. Multi-Level OMR enriches the data collection process by providing respondents with more ways to answer a question (makes the data more granular) and by providing researchers more precise data.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. However, the invention is not limited to the precise arrangements and instrumentalities shown.

In the drawings:

FIGS. 1a-1c show portions of prior art response forms; and

FIGS. 2-15 show portions of response forms in accordance with preferred embodiments of the present invention.

DETAILED DESCRIPTION OF THE INVENTION

Figure 9:
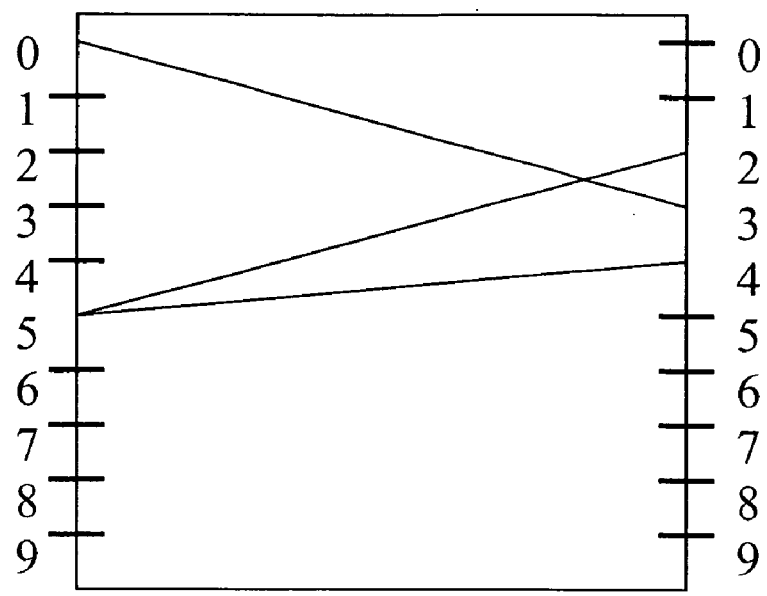

Certain terminology is used herein for convenience only and is not to be taken as a limitation on the present invention. In the drawings, the same reference letters are employed for designating the same elements throughout the several figures.

All of the Multi-Level OMR embodiments described below follow the same steps:

1. Pick an unambiguous symbology of marks to fill into a bubble design.

2. Design the form using that bubble shape. Have users fill out the form.

3. Recognize the filled in forms by doing the following:
   a. Search algorithms to find and isolate the bubbles on the image of the form page.
   b. Interpret the pixels associated with the bubble into a raw score(s) according to the symbology used to mark the bubble. The pixels associated with the bubble may be the pixels only inside of the bubble or may also include pixels around the periphery of the bubble.
   c. Translate the raw score into a limited number of possible states and output the results.

Symbology Choice

The ideal symbol set used for a particular form satisfies the following parameters:

1. There are enough different symbols that match the need for the particular survey question or test answer. Any extra symbols should be avoided to maintain the best accuracy.

2. The symbols to be marked should not be ambiguous. For example, in ICR, the letter "I" and the number "1" are ambiguous. Experimentation and practice may be needed to make a good symbol choice because users may be sloppy filling in forms. Marks which should be distinct are sometimes not drawn distinctly as in the case of the numbers "4" and "9". The ranges for symbologies that are continuous must be deliberately defined to be coarse-grained. Thus, if the symbology choice is the angle or length of a line, for example, a three-level symbology choice might be short lines at "0," "45," and "90" degree inclinations for a sloped line rather than "0," "5," and "10" degrees. The latter choice would be hard to draw and hard for the interpretation step to produce a valid raw score.

3. The size of the bubbles should be matched to the number of symbols that fill a bubble, the skill of the person completing the form, the type of paper and marking pencil or pen in use and type of scanning or reading equipment. Typically, multi-level bubbles should not be much smaller than half an inch on a side (12 mm) for human marked forms.

Symbology choices are depicted in the embodiments described below.

Form Design

The ideal bubble choice is one where the user does not have to learn special tools to create the form. Ideally, the bubbles would be characters, or dingbats, available on a computer keyboard. The form would also ideally be created with a word processor as in the case of Remark Office OMR. A symbol key should be provided on the form page showing the user how to fill in the bubbles if the person filling in the form is not trained.

Search

The image produced by a commercial scanner, such as the fi-4340C image scanner sold by Fujitsu Computer Products of San Jose, Calif., typically consists of rows of pixels in a format called Tagged Image File Format (TIFF). The algorithms in state-of-the-art commercial software-based OMR systems, such as Remark Office OMR, are sufficient to locate the bubbles in the image and pass individual thumbnail images or coordinates of the located bubbles to the interpretation step.

Symbology Interpretation

Multi-Level OMR takes the image of the bubble and first isolates the part that a person has filled in with pen or pencil. That is normally done by specifying that any filled in pixels on the interior of the bubble must be human-marked pixel data. The human-marked pixels are converted to a raw score depending on the appropriate algorithm, or combination of algorithms, for recognizing the contents of the bubble corresponding to the symbology expected. Some raw score generating algorithms include:

1. Simple count of the number of filled in pixels divided by the total number of pixels (percentage filled score).

2. Counts of the number of filled in pixels in various regions of the bubble. For example, if the bubble is divided up into four quadrants, count the number of filled in pixels in the upper left, upper right, lower left, and lower right quadrants.

3. Calculating a raw score from a pattern recognition algorithm such as template matching, the Medial axis transform or Karhunen-Loève transform.

4. Heuristic algorithms such as listing any lines drawn in the bubble and outputting a score depending on their orientation.

The correct choice of algorithms is made based on speed and accuracy of the interpretation.

Translation

Translation takes the raw score and looks it up in a table of values to be assigned. For example, the first interpretation algorithm above (percentage filled score), might have an "A" to "D" translation table as follows:

| Percentage of Bubble Filled | Output Value to be Assigned |
| --- | --- |
| 0 to 10% | Not filled |
| 11 to 30% | "A" |
| 31 to 50% | "B" |
| 51% to 70% | "C" |
| 71 and up % | "D" |

The look-up table can be complex and can depend on more than one raw score input. The translation table can be algorithmic, for example, "if the bubble is marked with a vertical bar symbol, output an 'I' if the preceding output was a character and output a '1' if the preceding output was a number."

INVENTION EMBODIMENTS

The following are preferred embodiments of Multi-Level OMR:

1. Six Level Bubbles

FIG. 2 shows a survey processing example. Each bubble is a square, although the bubbles could be in other shapes. The user is presented with a limited variety of ways to fill in the bubbles according to the symbol "key." After a user fills in a bubble with one of the symbols from the key, the second and fourth interpretation algorithms described above are preferably used in conjunction with a translation table such as shown in the following example:

| Bubble Contents (raw score) | Output Value to be Assigned |
| --- | --- |
| No lines, no quadrants filled | Not filled |
| Lower left quadrant filled, left-leaning line (i.e. a "slash") | "strongly disagree" |
| No quadrants filled, left-leaning line | "disagree" |
| No quadrants filled, left and right leaning lines | "neutral" |
| No quadrants filled, right-leaning line | "agree" |
| Lower right quadrant filled, right-leaning line | "strongly agree" |
| All quadrants filled | "no opinion" |
| Anything else | Error |

The bubble contents (raw score) from the pixels in each filled in bubble are translated into one of the limited number of allowed outputs value to be assigned. In the example of FIG. 2, the values range from "strongly disagree" to "strongly agree" and "no opinion." Traditional and Software-Based OMR would require six bubbles for this same survey example and a lot more space on the form. ICR systems need only one bubble per survey but would not be able to read the marked-in areas and output something intelligible with a desirable accuracy since a user is not drawing characters in the bubbles and ICR has hundreds of possible output values to pick between.

The Six Level Bubble may be extended to more levels by allowing users to fill in other quadrants, or to use a vertical bar, horizontal bar, and plus sign ("+"). The quadrants filled would thus be the triangles outlined by the white space around an "X" drawn in the bubble, or the white space around the plus sign as in the Cartesian quadrants as shown in the alternate answer key for FIG. 2.

2. Elongated Bubble Column

Another embodiment of Multi-Level OMR is shown in FIG. 3. Traditional OMR would use one column of ten bubbles to represent a one digit number ("0" to "9") similar to FIG. 1. Multi-Level OMR replaces the ten bubbles by a single computer-readable elongated bubble column depicted in FIG. 3, thereby resulting in substantial savings in the real estate of the form. The interpretation step involves measuring the length of the line drawn (i.e., the symbol) in the bubble compared with the total elongated bubble length. Specifically, the Multi-Level OMR computer algorithms start at one end of the elongated bubble, the base, and analyze the pixels inside the elongated bubble to determine how much was marked as the raw score. The percentage completed is translated to a desired scale such as "0" to "9" (or "A" to "Z"). The size of the bubble, resolution accuracy of the specific reader device (e.g., image scanner), as well as the accuracy of the individual filling in the bubble determine the upper boundary for how many levels are possible with this bubble design.

FIG. 3 shows three levels, namely, "0," "5," and "9." Ten levels would allow for "0," "1," "2," "3," "4," "5," "6," "7," "8," and "9" to be selectable.

Bubble Density

FIG. 4a and FIG. 4b each show a Multi-Level OMR bubble where the percentage of filled pixels in the bubble is applied to a scale to determine the value. For example, if a bubble has a translation scale of "0" to "9" and the raw score for the bubble indicates it was 63% filled (either all at one end or randomly in the bubble), the 63rd percentile would fall in the sixth scale position causing the bubble to return a value of "6". This embodiment uses a translation table similar to the one shown in the Translation section above.

Position of Line

FIG. 5a through FIG. 5e show Multi-Level OMR bubbles where the position of a line drawn through a bubble determines the bubble value. The interpret step compares the position marked to the bubble's beginning and ending lines to provide a raw score. The raw score is then translated using an appropriate table into the corresponding scale marked on the side of the bubble. For example, an elongated bubble (rectangle) may be divided into n segments where each segment represents one scale position. These segment values may or may not be listed along the bubble. Alternatively, a line drawn through one of the segments (or perhaps all of the segments up to a certain point) determines the bubble's raw score. A series of bubbles of this type may be used to return both numbers and text (e.g., a social security number or a name or an alphanumeric part number).

Bubble Angle

FIG. 6a and FIG. 6b show a bubble where the user draws a line between the center of the circle and an edge to indicate their input. The image processing algorithms then measure the inclination angle of the line to provide the raw score. The raw score is then translated into an output value. For example, in FIG. 4b, the angle measured is 45 degrees and the translation table is one-to-one so the output is "45". Although FIG. 6a and FIG. 6b show the bubble as being a circle, the bubble can also be an arc of a predetermined degree, less than 360 degrees wherein the angle on the arc is used to determine response value.

Relative Line Position

FIG. 7 shows a bubble with scales on both sides. The raw score of a bubble is determined by the computer algorithms following a line from one side of the bubble to the other where each side of the bubble represents distinct scales similar to the "position of line" embodiment described above. The ending value (determined by the position of the line on the "ending" side of the bubble) is subtracted (or alternatively added) from the starting value (determined by the position of the line on the "starting" side of the bubble) to give the raw value score (in two steps). In exemplary FIG. 7, the translation scale of 0-9 is applied to both the starting (left) and the ending (right) sides of the bubble. A line drawn from a starting value of 2 to an ending value of 0 represents the bubble value of (2−0)=2. A line drawn from a starting value of 4 to an ending value of 2 also represents a bubble value of 2, (4−2)=2.

Line Sequence

Combining relevant parts of selected embodiments described above, a single bubble may represent n values by drawing a line from a sequence number to its corresponding value within a scale on the opposite side of the bubble. For example, a 10 digit number may be represented by drawing 10 lines; one line for each cell on one side of the bubble. The value of sequence position 5 is represented by the position of the line drawn from sequence 5 to its corresponding value (within the defined scale). For the example in FIG. 8, the four digit number "1582" is shown.

Adding Line Values

The value of a bubble may also be determined by adding (or subtracting, or applying another arithmetic function) the start value of one or more lines with their ending values. Start and end values are determined by the line position within the appropriate scale. A single bubble may have n number of translation scales applied to it. The bubble's return value is determined by concatenating the value of each line or by adding all the line values together. For example, the raw scores from FIG. 9 may be translated to represent a plurality of digits, such as the digits 7, 3 and 9 (in no particular order), or a single value "19" (calculated by adding 7+3+9).

Center to Edge (or Just Edge)

Figure 10:
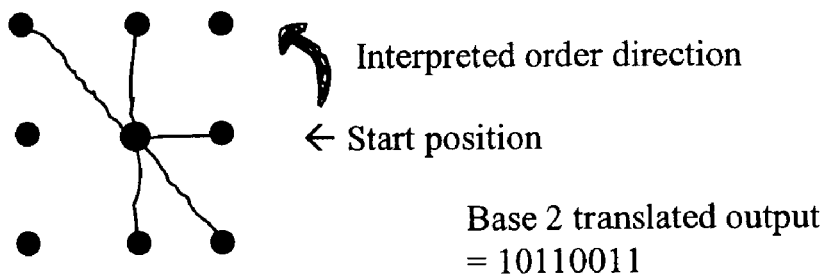

The raw score of a bubble may also be determined by drawing a line between the center of the mark and an outside edge, like the Bubble Angle embodiment, but multiple lines are allowed and are significant for sequencing. The point at which the line intersects the outside edge corresponds to a particular translation scale, like the digits of a binary number shown in FIG. 10. The lines can also be made by the user filling in the bubble by just drawing a line through the outside edge without intersecting the center of the bubble (i.e., one point on the edge directly to another).

Bubble Areas

The total area within a bubble may be divided into segments or subsections which are interpreted independently. The combined bubble raw score value is determined by darkening the appropriate subsections within the bubble. Each subsection affects the translated output value. FIG. 11a shows an example where 10 bubble areas represent the 10 digits ("0" to "9"). Some of the bubble areas may be designated as "scaling" bubbles to represent an added amount or a multiplier (e.g., 2, 3, 4, 5, etc. or 0.1, 10, 100, etc.). If more than one multiplier is darkened, then the multiplier values themselves are multiplied and the darkened digit(s) is scaled based on the resultant multiplier. Alternatively, some of the bubble areas may be designated as "added amount" bubble areas (e.g., +25%, +50%, etc. or +5, +10, etc.)

FIG. 11b is a variation of FIG. 11a where traditional OMR bubbles are run together and interpreted as one complex bubble.

Overlapping Bubbles (Shapes)

The raw score of a series of overlapping (or intersecting) bubble subsections are determined by applying a different score to each subsection. More specifically, the response bubble is a response region defined by a plurality of closed plane figures (e.g., circles or ovals), wherein at least some of the closed plane figures overlap with each other. The translated output value of each overlapping section then becomes the sum, product, or other combination of the overlapping bubbles. Also, the translated output value is determined by applying an equation (e.g., adding or multiplying) the values of all filled sections. In FIG. 12, the area in which the bubbles with a raw score value of 2 and 3 respectively overlap is filled. The translated output value may be the sum of those two values, (2+3)=5. If additional areas were filled, then those values may also be added to the total.

Disregard Scale

As shown in FIG. 13, each of the above examples may also optionally include a "disregard" translation scale item where, if selected, the bubble value would be disregarded (i.e., not calculated). A disregard scale item applied to a traditional bubble (two states: filled/unfilled) would add a third state: disregard. For example, an empty bubble would be considered unfilled, a bubble with an "X" through it would be considered filled, and a bubble that is totally filled would be disregarded. The disregard setting is simply an optional translation scale item. For example a bubble or series of bubbles may have the following scale applied to it: "Unfilled," "0," "1," "2," "4," "5," "6," "7," "8," "9," and "Disregard" (12 possible states). One area where this embodiment could be useful is to allow the user to represent a mistake that should be ignored. That is, when using non-erasable pen to fill out a form, the disregard state means that this bubble should be skipped. Depending upon the nature of the data, the next (or another) bubble in sequence is used to take this bubble's place in the final result.

Invert the Marking Process

Each of the above examples may also be implemented using an "inverted marking" approach. In this technique, instead of the user marking the item they mean to represent, the user "unmark" the items they do not want to represent. More specifically, as an example, a form is printed using erasable black ink. The user then erases the ink, or punches a hole, and leaves only the marking information that represented their answer. Similarly, instead of using an eraser or punch, a special color or other overlay "coating" is used to unmark all the options that were not to be selected. As an alternate embodiment, all of the bubbles are scratched out or darkened, except the bubble or bubbles that the user wanted to represent.

In an additional alternate embodiment, an assumption can be made in translation that "all bubbles are selected except for those that are marked". For example, a question might read "Which of the following items do not apply?" and the possible answers might be "1," "2," "3," "4," and "5." If the respondent fills in "2" and "5," then the bubble value would be translated to be "1," "3," and "4."

Combination Schemes

Multiple bubble styles may be combined to produce multiple raw scores and more complex translation tables.

Figure 14A:
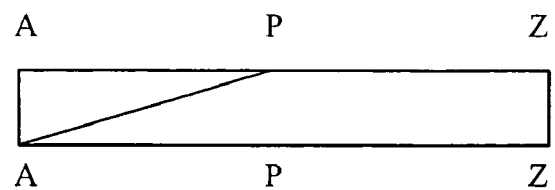
Figure 14B:
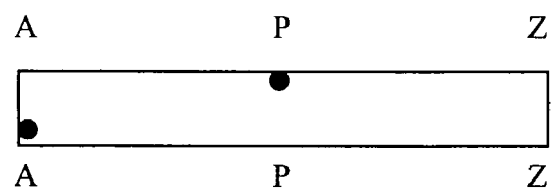
Figure 14C:
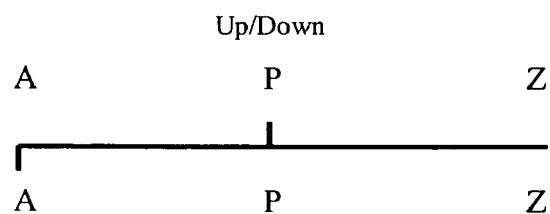

For example, FIGS. 14a, 14b, and 14c depict embodiments that use a relative scale where what is recorded on either side of the bubble is interpreted as a different output. In the example illustrated, a single bubble captures two letters or numbers, as in the abbreviation of a state. These embodiments make use of the Elongated Bubble Column and the Position of Line embodiments.

Figure 15:
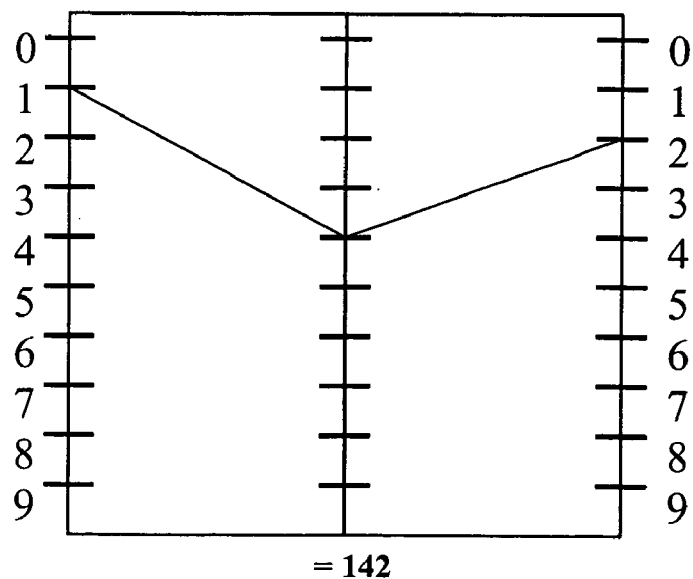

FIG. 15 depicts entering a multiple digit number in a multipart bubble. This embodiment makes primary use of the Elongated Bubble Column and the Relative Line Position embodiments.

Additional Considerations

A response bubble as described herein can also be considered to be a response region, and vice-versa. A response bubble need not necessarily have a clearly defined outline, such as in the embodiment shown in FIG. 4a and FIG. 4b. For example, the embodiments shown in FIG. 5e, FIG. 10 and FIG. 14c have response regions, but do not have explicitly defined outlines.

In one preferred embodiment, the forms are scanned by a scanning system that uses an optical mark reader. However, in other embodiments, the scanning system may be an image scanner or camera in a computer that runs software to control the image scanner or camera and to interpret/translate the symbology.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of using at least one response bubble on a scannable form to be read by a scanning system, the method comprising:
   (a) defining an unambiguous symbology of non-alphanumeric marks to fill into each response bubble, thereby allowing at least one of a plurality of different non-empty intended responses having different output values to be entered into each response bubble;
   (b) providing at least one response bubble on the scannable form to be filled in according to the defined symbology of unambiguous non-alphanumeric marks; and
   (c) scanning a filled in form with the scanning system and processing an image of the scanned form to:
      (i) identify pixels associated with each response bubble,
      (ii) interpret the pixels associated with each response bubble to define a raw score according to the defined unambiguous symbology of non-alphanumeric marks used to mark each response bubble,
      (iii) translate the raw score for each response bubble into one of the plurality of different non-empty intended responses, and
      (iv) output the value of the non-empty intended response for each response bubble, wherein the different output values have different meanings, and wherein the output value of the non-empty intended response for each response bubble is determined solely from the marks filled into the response bubble.

2. The method of claim 1 wherein the marks include a plurality of differently oriented single lines or pairs of lines.

3. The method of claim 2 wherein each response bubble is rectangular and the plurality of differently oriented lines or pairs of lines extend from one edge or corner of the rectangular bubble to another edge or corner of the rectangular bubble.

4. The method of claim 1 wherein each response bubble is rectangular and the marks include a plurality of different quadrants of the rectangle being filled.

5. The method of claim 1 wherein each response bubble has at least two opposing edges, step (a) further comprises defining a scaled set of ordered response values from one opposing edge to the other opposing edge of a response bubble, wherein the length of a line drawn within each response bubble and extending from one opposing edge to the other opposing edge relative to the total length from the one opposing edge to the other opposing edge defines the unambiguous symbology of marks and determines the response value, and step (b) further comprises providing at least one response bubble on the scannable form as defined in step (a) to be filled in by drawing a line of a desired length within each response bubble extending from one of the opposing edges.

6. The method of claim 5 wherein each response bubble is an elongated bubble column.

7. The method of claim 5 wherein the scaled set of ordered response values represent a range of alphanumeric characters.

8. The method of claim 1 wherein each response bubble is a rectangle having a first and second set of opposing edges, a response being a line drawn between the first set of opposing edges within the response bubble, the line being parallel to the second set of opposing edges, wherein step (a) further comprises defining a scaled set of ordered response values determined by the height of the response line with respect to the second set of opposing edges of a response bubble, the height defining the unambiguous symbology of marks, thereby allowing a line entered in each response bubble to represent at least one of a plurality of different response values, and step (b) further comprises providing at least one response bubble on the scannable form as defined in step (a) to be filled in by drawing a line between the first set of opposing edges within the response bubble at a desired height.

9. The method of claim 8 wherein the scaled set of ordered response values represent a range of alphanumeric characters.

10. The method of claim 1 wherein each response bubble is a rectangle having a first and a second set of opposing edges, a response being one or more lines drawn between the first set of opposing edges within the response bubble, wherein step (a) further comprises defining a scaled set of ordered response values for each line drawn determined by the height of one end of the one or more response lines of a response bubble with respect to the second set of opposing edges, the height defining the unambiguous symbology of marks, thereby allowing at least one of a plurality of different response values to be entered into each response bubble for each line drawn, and step (b) further comprises providing at least one response bubble on the scannable form as defined in step (a) to be filled in by drawing one or more lines between the first set of opposing edges within each response bubble, each line ending at a height that represents the desired response value for the respective line.

11. The method of claim 10 wherein the scaled set of ordered response values represent a range of alphanumeric characters.

12. The method of claim 11 wherein a plurality of lines may be drawn in each response bubble, each line beginning at a successively greater height at one end of the first set of opposing edges and representing a respectively ordered digit in a multi-digit response value, and ending at the other end of the first set of opposing edges at a height that represents the desired response value for the respective line.

13. The method of claim 1 wherein each response bubble is a rectangle having a first and a second set of opposing edges, a response being one or more lines drawn between the first set of opposing edges within the response bubble, wherein step (a) further comprises defining a scaled set of ordered response values for each line drawn determined by the height of one end of the one or more response lines with respect to the second set of opposing edges of a response bubble, each line having a response value equal to the difference between the height at one end and the height at the other end, the height difference defining the unambiguous symbology of marks, thereby allowing at least one of a plurality of different response values to be entered into each response bubble for each line drawn, and step (b) further comprises providing at least one response bubble on the scannable form as defined in step (a) to be filled in by drawing one or more lines between the first set of opposing edges within each response bubble.

14. The method of claim 13 wherein the scaled set of response values represent a range of alphanumeric characters.

15. The method of claim 1 wherein each response bubble is a rectangle having a first and a second set of opposing edges, a response being one or more lines drawn between the first set of opposing edges within the response bubble, wherein step (a) further comprises defining a scaled set of ordered response values for each line drawn determined by the height of one end of the one or more response lines with respect to the second set of opposing edges of a response bubble, each line having a response value equal to the sum of the height at one end and the height at the other end, the height sum defining the unambiguous symbology of marks, thereby allowing at least one of a plurality of different response values to be entered into each response bubble for each line drawn, and step (b) further comprises providing at least one response bubble on the scannable form as defined in step (a) to be filled in by drawing one or more lines between the first set of opposing edges within each response bubble.

16. The method of claim 15 wherein the scaled set of ordered response values represent a range of alphanumeric characters.

17. The method of claim 1 wherein each response bubble is filled in by shading a portion of the area inside of the response bubble, and
    step (a) further comprises defining a scaled set of response values having different output values which are directly proportional to the percentage of the response bubble shaded in, the percentage of the response bubble shaded in defining the unambiguous symbology of marks, thereby allowing a plurality of different response values having different output values to be entered into the response bubble; and
    step (b) further comprises providing at least one response bubble on the scannable form to be filled in by shading a portion of the area inside of each response bubble in accordance with the desired response value having a respective output value.

18. The method of claim 17 wherein each response bubble is a rectangle having a first and second pair of edges, and the portion to be shaded is a rectangle extending between the first pair of edges and beginning at one of the edges of the second pair of edges, and wherein the output value for each response bubble is determined solely from the shaded portion of the response bubble.

19. The method of claim 1 wherein each response bubble is defined by an arc of predetermined degree, each response bubble being filled in by making a mark within the response bubble, wherein step (a) further comprises defining a scaled set of ordered response values which correspond to an arc position on the arc, the arc position defining the unambiguous symbology of marks, and step (b) further provides at least one response bubble on the scannable form to be filled in by a mark within the response bubble that touches an edge of the response bubble, the edge being an arc position that corresponds to a desired response value.

20. The method of claim 19 wherein the mark is a line mark, one end of the line mark touching the edge, the other end of the line mark terminating within the response bubble.

21. The method of claim 20 wherein the line mark extends from the center of the response bubble to an edge of the response bubble.

22. The method of claim 19 wherein the arc is a 360 degree arc.

23. The method of claim 1 wherein step (a) further comprises defining a single response bubble having a plurality of separate regions, each region representing a different value, the plurality of separate regions representing a different value defining the unambiguous symbology of marks, and step (b) further comprises providing at least one of the single response bubbles on the scannable form, each single response bubble to be filled in by marking the one or more separate regions to indicate one more desired responses.

24. The method of claim 1 wherein step (a) further comprises defining a single response region having a plurality of separate response bubbles, at least some of the response bubbles representing a different value, the plurality of separate regions representing a different value defining the unambiguous symbology of marks, and step (b) further comprises providing at least one response region on the scannable form, each response region to be filled in by marking the one or more separate response bubbles to indicate one more desired responses.

25. The method according to claim 24 wherein the single response region is generally defined by a rectangle and each response bubble is in non-overlapping contact with each adjacent response bubble.

26. The method according to claim 1 wherein the response bubble is a response region defined by a plurality of closed plane figures, at least some of the closed plane figures overlapping with each other, step (a) further comprising defining a response value that can be indicated by placing a mark in the response region, each closed plane figure having a response value, wherein the unambiguous symbology of marks is defined by rules wherein if a mark is placed in a non-overlapping portion of a closed plane figure, the response value is equal to the response value of the closed plane figure, and if a mark is placed in an overlapping portion of a closed plane figure, the response value is equal to the sum of the response values of the overlapping closed plane figures, thereby allowing one of a plurality of different response values to be entered into each response bubble, and step (b) further comprises providing at least one response region on the scannable form, the response value of each response region being determined based on placement of a mark within the response region as defined in step (a).

27. The method of claim 26 wherein the closed plane figures are circular shapes.

28. The method of claim 26 wherein only a single mark is made in the response region.

29. The method of claim 26 wherein if a plurality of marks are made in different overlapping or non-overlapping portions, the response value is equal to the sum of the response values associated with the respective overlapping or non-overlapping portions.

30. The method of claim 1 wherein the response bubble is a region having a plurality of points surrounding a center point, each response region having a plurality of sequential binary response values, which, taken together, determine a total binary response value associated with the response region, step (a) further comprising defining a binary response value as being the presence or absence of a line drawn between the center point and each of the points surrounding the center point, the total binary response value being a sequential string of the binary response values determined in either a clockwise or counterclockwise direction from a given starting point surrounding the center point, the binary value determination process being the unambiguous symbology of marks, and step (b) further providing at least one response region on the scannable form, the total binary response value represented by the response region being determined based on line marking as defined in step (a).

31. The method of claim 30 wherein the plurality of points surrounding the center point are equidistantly spaced around the center point.

32. The method of claim 31 wherein the distance between each pair of adjacent points surrounding the center point is identical.

33. The method of claim 1 wherein each response bubble is a rectangle having a first and a second set of opposing edges, a response being one or more lines drawn between the first set of opposing edges within the response bubble, step (a) further comprising defining a scaled set of ordered response values for each line drawn determined by the height of each end of the one or more response lines with respect to the second set of opposing edges of a response bubble, each line defining two response values, each response value being associated with a respective end of the response line, the unambiguous symbology of marks being the association of the respective ends of the response line with two response values determined by the height, thereby allowing a plurality of different combinations of two response values to be entered into each response bubble for each line drawn, and step (b) further comprises providing at least one response bubble on the scannable form as defined in step (a) to be filled in by drawing one or more lines between the first set of opposing edges within each response bubble.

34. The method of claim 33 wherein the response bubble has one or more intermediary lines extending between the second opposing edges, each intermediary line defining a rectangular subregion of the rectangular response bubble, each of the intermediary lines also defining a scaled set of ordered response values determined by the height of each end of the one or more intermediary lines with respect to the second set of opposing edges of a response bubble, a response being one line drawn between each subregion, wherein the end of each line has the same response value as the beginning of an adjacent line, thereby allowing a plurality of different combinations of at least three response values to be entered into each response bubble, and step (b) further comprises providing at least one response bubble on the scannable form as defined in step (a) to be filled in by drawing a line within each subregion.

35. The method of claim 33 wherein the scaled set of ordered response values represent a range of alphanumeric characters.

36. The method of claim 1 wherein each response bubble is a rectangle having a first and a second set of opposing edges, a response being two marks made at or near respective opposing edges of the first set of opposing edges, step (a) further comprising defining a scaled set of ordered response values for each mark determined by the height of the mark with respect to the second set of opposing edges of a response bubble, each pair of marks defining two response values, the response value of each mark being determined by its height with respect to the second set of opposing edges of a response bubble, the unambiguous symbology of marks being the association of the respective marks with two response values determined by the height, thereby allowing a plurality of different combinations of two response values to be entered into each response bubble for each pair of marks drawn, the method further comprising providing at least one response bubble on the scannable form as defined in step (a) to be filled in by making two marks at or near respective opposing edges of the first set of opposing edges.

37. The method of claim 36 wherein the scaled set of ordered response values represent a range of alphanumeric characters.

38. The method of claim 1 wherein each response region has a line defined by first and second ends, a response being at least one mark placed on or near the line, step (a) further comprising defining a scaled set of ordered response values for each mark determined by the distance of the mark from one end of the line, the response value of each mark being determined by the distance of the mark from one end of the line, the unambiguous symbology of marks being the distance of the mark from one end of the line, thereby allowing one or more response values to be entered into each response region, and step (b) further comprises providing at least one response region on the scannable form as defined in step (a) to be filled in by making one or more marks on or near the line.

39. The method of claim 38 wherein each mark is a line mark which is perpendicular to the line and intersects the line.

40. The method of claim 38 wherein each mark is a line mark which is perpendicular to the line and extends either upward or downward from the line.

41. The method of claim 38 wherein the scaled set of ordered response values represent a range of alphanumeric characters.

42. A method of using at least one response bubble on a scannable form read by a scanning system, each response bubble being filled in by shading a portion of the area inside of the response bubble, the method comprising:
  (a) defining a scaled set of response values which are directly proportional to the percentage of the response bubble shaded in, thereby allowing a plurality of different non-empty intended response values having different output values to be entered into the response bubble;
  (b) providing at least one response bubble on the scannable form to be filled in by shading a portion of the area inside of each response bubble in accordance with the non-empty intended response value; and
  (c) scanning a filled in form with the scanning system and processing an image of the scanned form to:
    (i) identify pixels associated with each response bubble,
    (ii) interpret the pixels associated with each response bubble to define a raw score according to step (a),
    (iii) translate the raw score for each response bubble into one of the plurality of different non-empty intended responses, and
    (iv) output the value of the non-empty intended response for each response bubble, wherein the different output values have different meanings, and wherein the output value of the non-empty intended response for each response bubble is determined solely from the marks filled into the response bubble.

43. The method of claim 42 wherein each response bubble is a rectangle having a first and second pair of edges, and the portion to be shaded is a rectangle extending between the first pair of edges and beginning at one of the edges of the second pair of edges, and wherein the output value for each response bubble is determined solely from the shaded portion of the response bubble.

* * * * *